UNITED STATES PATENT OFFICE.

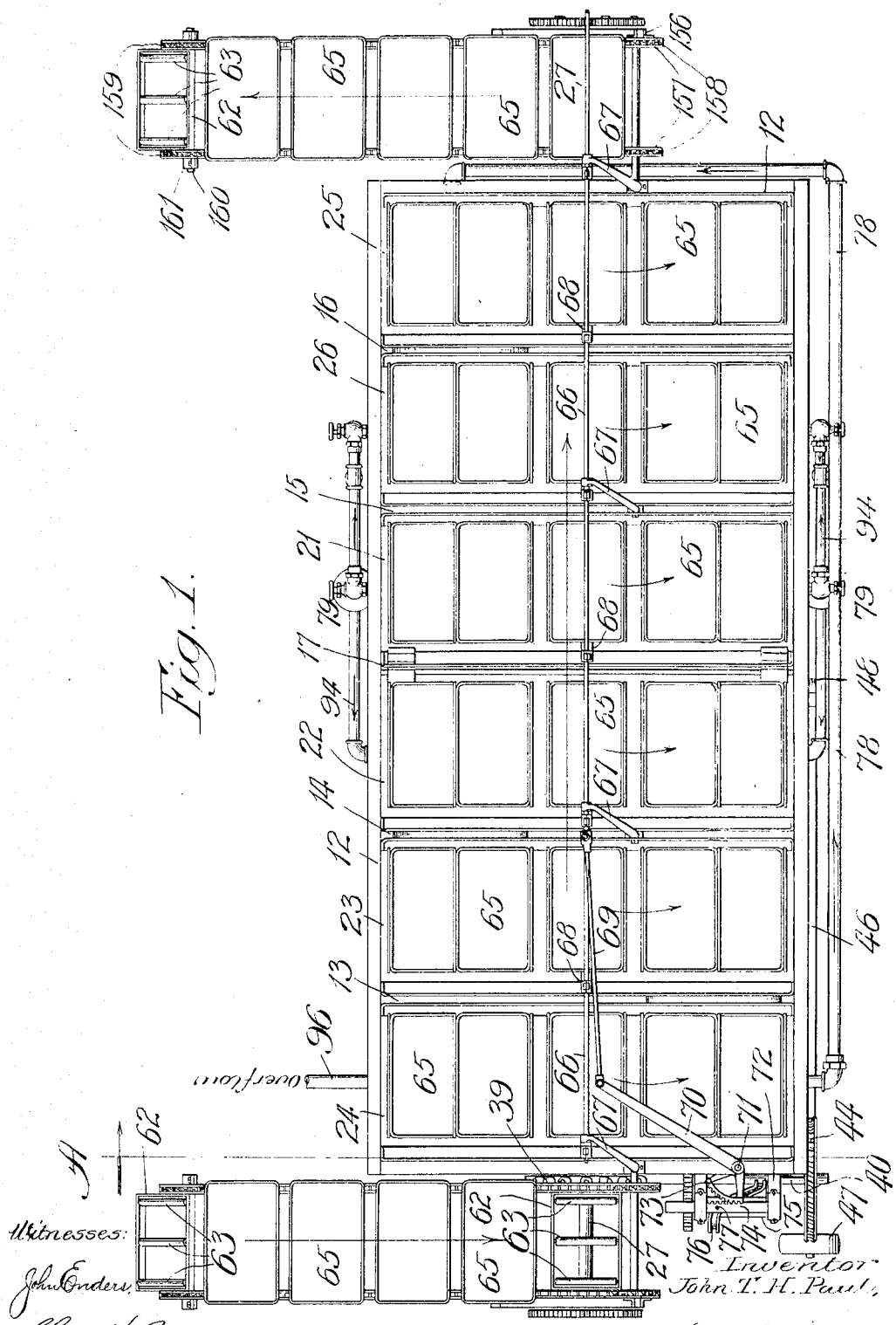

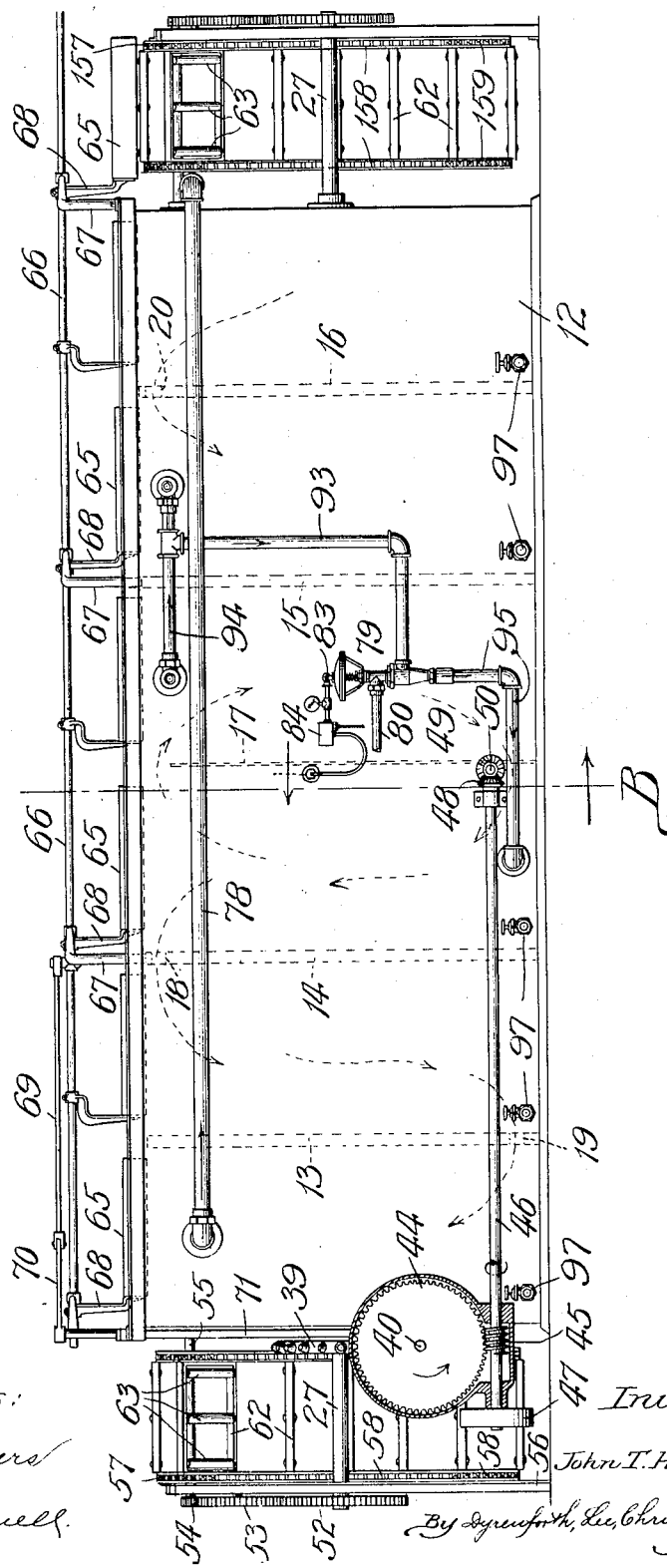

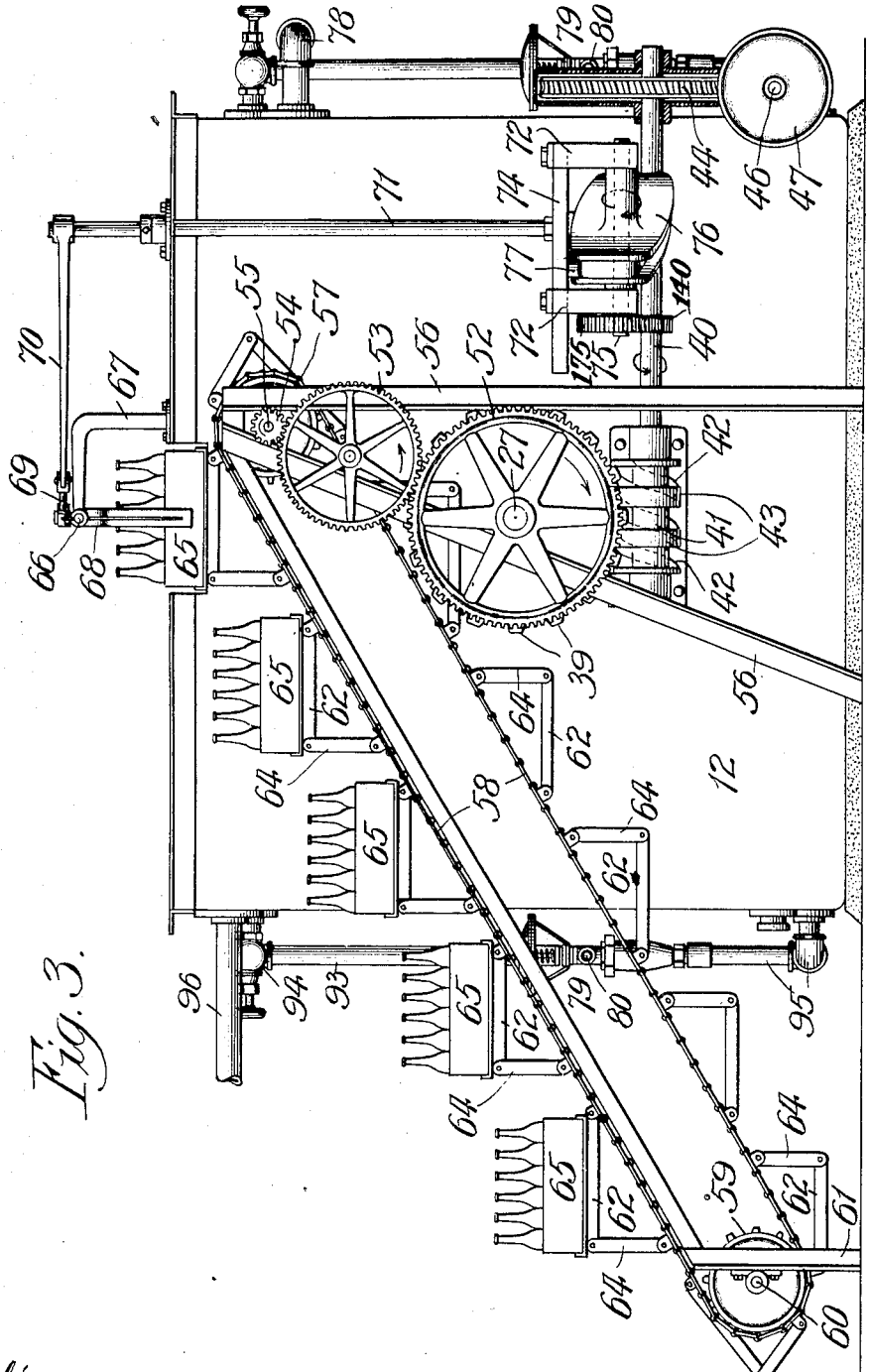

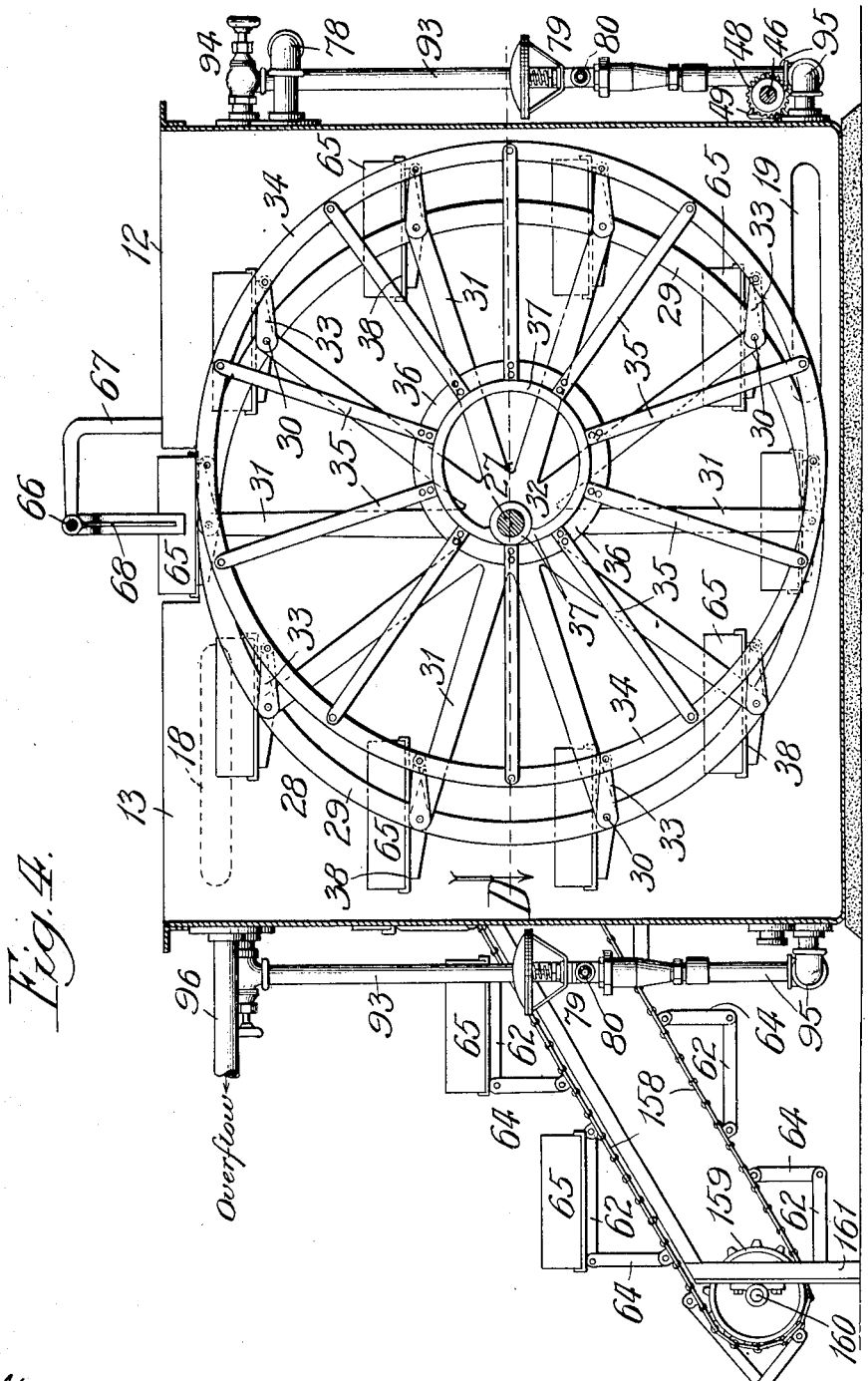

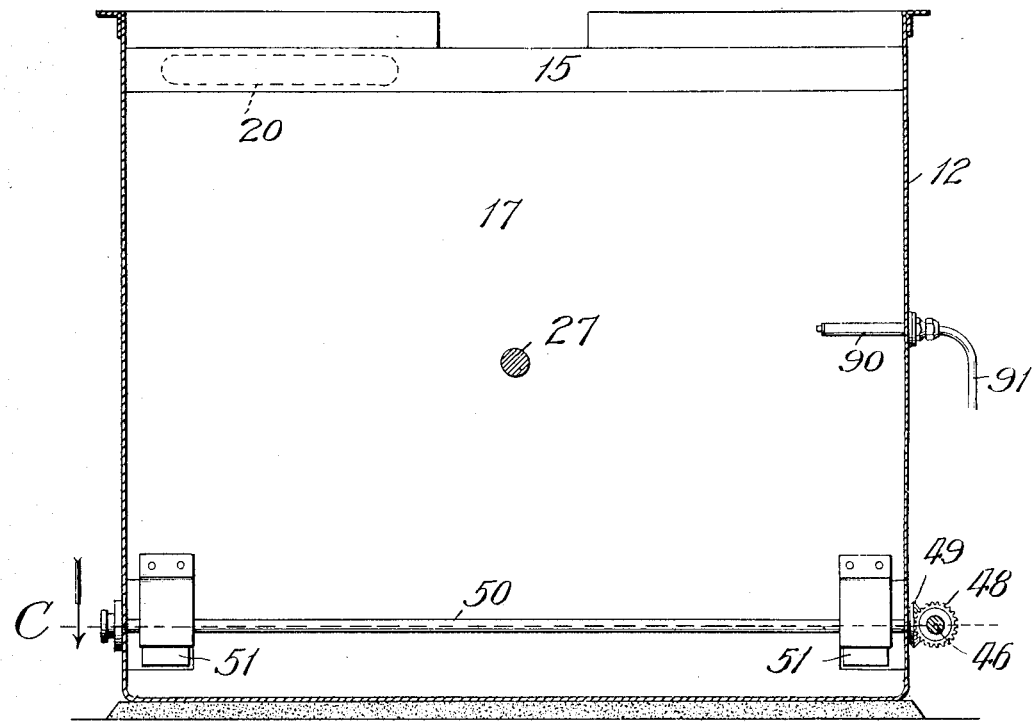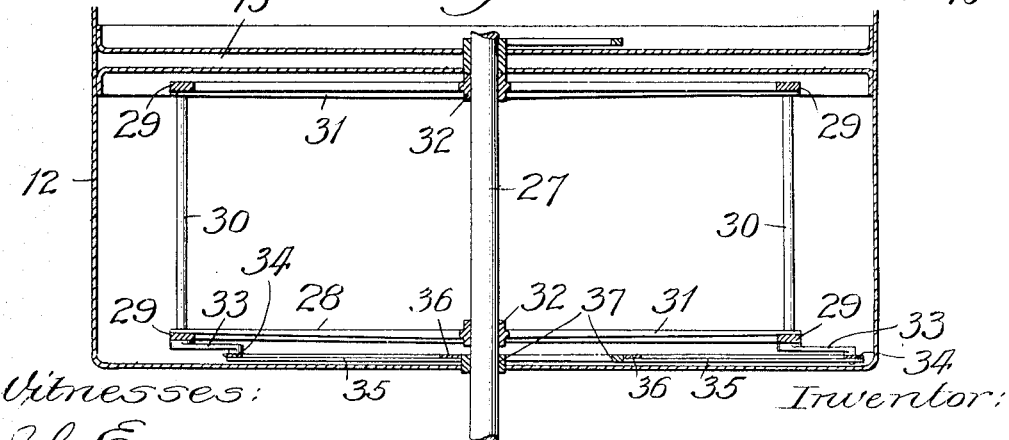

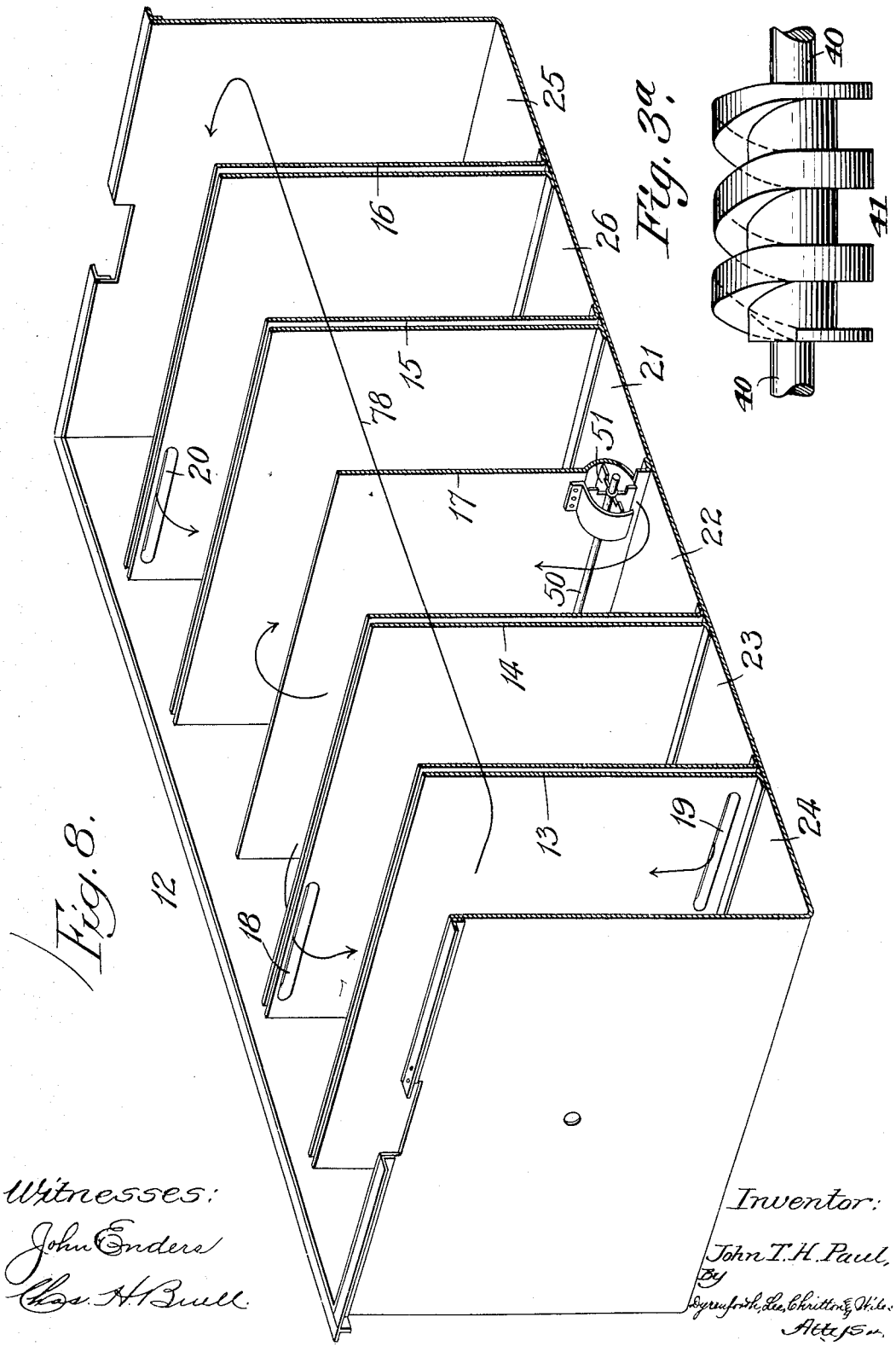

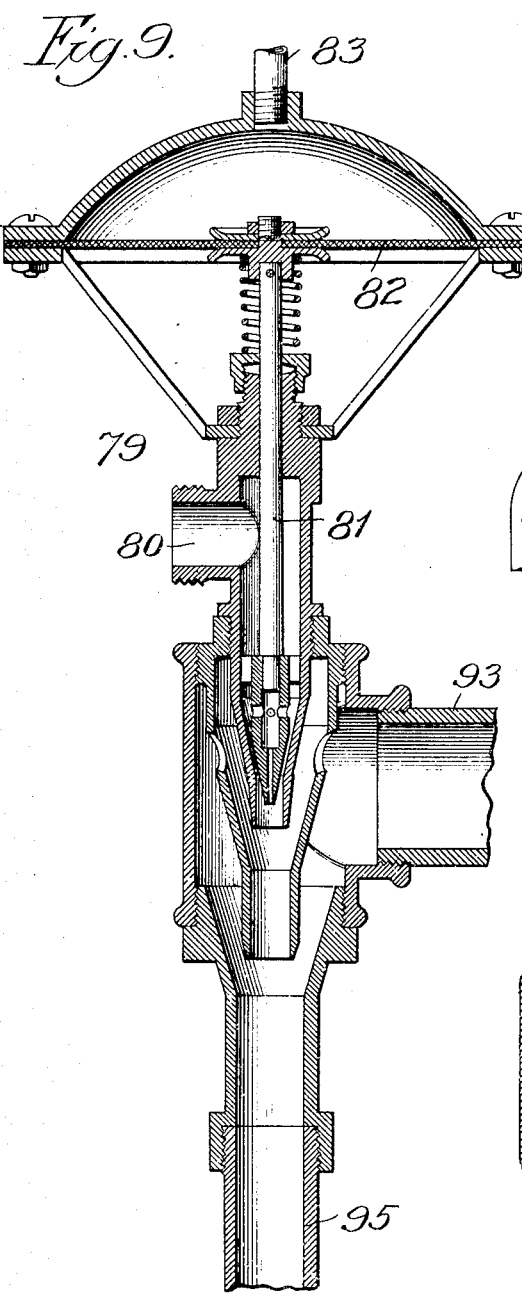
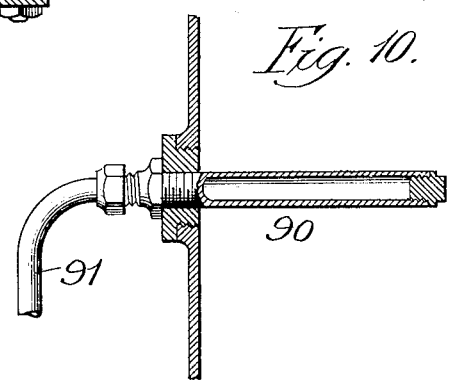
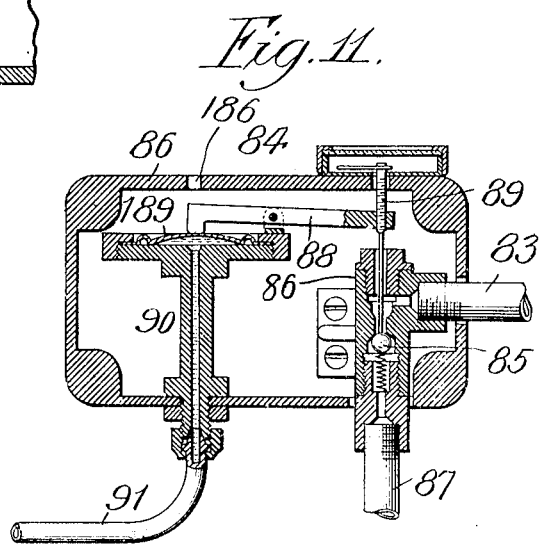

JOHN T. H. PAUL, OF CHICAGO, ILLINOIS, ASSIGNOR TO E. GOLDMAN & CO., INC., OF CHICAGO, ILLINOIS, A CORPORATION OF ILLINOIS.

PASTEURIZING APPARATUS.

No. 913,910.     Specification of Letters Patent.     Patented March 2, 1909.

Application filed May 28, 1908. Serial No. 435,443.

*To all whom it may concern:*

Be it known that I, JOHN T. H. PAUL, a citizen of the United States, residing at Chicago, in the county of Cook and State of Illinois, have invented a new and useful Improvement in Pasteurizing Apparatus, of which the following is a specification.

My invention relates to improvements in the class of pasteurizers in which the material to be pasteurized, contained in packages—as liquids in bottles—is caused to travel slowly and intermittently through a series of compartments containing water at successive temperatures increasing to that required for effecting pasteurization and thereafter decreasing, the packages being intercepted in each compartment and carried about therein, by intermittent motion, or rotary carriers.

In the accompanying drawings, Figure 1 is a plan view of the apparatus; Fig. 2 is a view of the same in side elevation, and Fig. 3, an end view; Fig. 3ª is a broken view in front elevation of the mutilated driving member of the intermittent-motion device; Fig. 4 is an enlarged section on line A, Fig. 1, and Fig. 5, a similar section on line B, Fig. 2; Fig. 6 is a section on line C, Fig. 5, and Fig. 7, a section on line D, Fig. 4; Fig. 8 is a perspective view of the tank in longitudinal section, showing its division into compartments which are, for the most part, intercommunicating; Fig. 9 shows a steam-jet device in longitudinal section for heating and circulating the water in the pasteurizing compartments, and Figs. 10 and 11 are sectional views respectively of a thermostat-device and an air-pressure valve-device for controlling the operation of the steam-jet device.

For the purpose of the following description, the material to be treated may be considered to be beer in bottles.

The tank 12 is shown of oblong rectangular form and is divided into compartments, of which six are shown (Fig. 8) by similar vertical double partitions 13, 14, 15 and 16, each forming between its sections an insulating air-space, and a single central partition 17 extending to a lesser height in the tank than the others. A port 18 in the upper part of the partition 14 connects the compartments 22 and 23 and the latter communicates with the compartment 24 through a port 19 in the lower part of the partition 13; the compartments 25 and 26 communicate through a port 20 in the upper part of the partition 16, but the compartments 26 and 21 do not intercommunicate directly and the compartments 21 and 22, which form the pasteurizing compartment, communicate over the upper edge of the relatively lower partition 17 and through the bottom of the latter near its opposite ends. It would, of course, be possible to construct the tank in sections joined together and forming the compartments.

A shaft 27 extends lengthwise and centrally through the tank, being journaled in the ends thereof and in the partitions. Rotary basket or receptacle carriers 28 are secured on the shaft to turn with it, one in each compartment, and are all of the preferred wheel-construction best illustrated of the one represented in Figs. 4 and 7: A pair of similar annular rims 29, 29 are connected by rock-shafts 30 journaled at uniform intervals apart in and extending between the rims which are rigidly connected by spokes 31 with the central hub 32 secured on the shaft 27. The rock-shafts carry on corresponding ends cranks 33 which are fastened to an annular rim 34 connected by spokes 35 with a ring 36 supported concentrically of the rim 34 by rotatably surrounding an annular hub 37, which is fastened eccentrically upon the shaft 27 to rotate with it. The rim 34 thus rotates with the shaft and affords an eccentric connection therewith of the cranks for turning them as and for the purpose hereinafter described. On each rock-shaft is secured to turn with it a basket-holder 38.

To drive the shaft 27 it carries on one end a gear-wheel 39 to be engaged by an intermittent drive of the preferred construction illustrated, comprising a rotary shaft 40 journaled in suitable bearings and carrying on one end a mutilated gear 41 consisting of worm-sections 42 extending part way about the shaft and straight teeth 43 extending about the remaining portion of the shaft's circumference and joining the ends of successive worm-sections. On the opposite end of the shaft 40 is a worm-wheel 44 meshing with a worm 45 on the drive-shaft 46, which is journaled in suitable bearings and carries on one end a belt-pulley 47 and on its opposite end a beveled pinion 48 meshing with a similar pinion 49 on a shaft 50 journaled in bearings on the base of the partition 17.

The shaft 50 carries on each end a shielded agitator 51 in an opening in the base of the partition to act upon the water in both compartments 21 and 22, as and for the purpose hereinafter explained.

A gear-wheel 52 on the end of the shaft 27 carrying the gear 39 meshes with an idler 53, which in turn meshes with a pinion 54 on a shaft 55 journaled, like the idler 53 and shaft 27, in bearings in a frame 56 at the adjacent receiving end of the tank and carrying a pair of sprockets 57 connected by inclined chains 58 with similar sprockets 59 on a shaft 60 journaled in bearings on a lower frame 61. At the opposite, delivery end of the tank is provided a frame 156 like the frame 56 and having journaled in it a shaft 155 carrying sprockets 157 connected by inclined chains 158 with similar sprockets 159 on a shaft 160 journaled in a lower frame 161, all as at the receiving end of the tank, except that the chains 158, forming a conveyer, must travel in the direction opposite that in which the conveyer-chains 58 travel, and to that end are suitably geared to the shaft 27, as indicated in Fig. 1, by the interposition in the gear-train of an additional idler. On each pair of the chains 58 and 158 are fastened at uniform intervals apart platforms 62, each consisting, as its preferred construction, of a rectangular frame (Fig. 1) in which rollers 63 are journaled, with one end of the frame pivotally connected with the pair of chains and the other end connected therewith by links 64, whereby the roller platforms are rendered flexible to adapt them to pass freely about the sprockets and always occupy a horizontal position in their travel along the inclined way of the conveyer to properly support baskets 65 filled with bottles containing the beer to be received into and delivered from the tank. The platform-rollers facilitate imposing the boxes on and removing them from the platforms.

As will be hereinafter more fully explained, the operation of the machine involves intermittent rotation of the shaft 27 to bring a longitudinal series of the holders 38 on successive carriers 28 in horizontal alinement with the feed and discharge positions of the baskets 65, so that each alternate time that the carriers are arrested a fresh box may be introduced into place upon the first carrier, and the baskets ahead of it advanced upon successive carriers, while the alining basket on the final carrier is advanced out of the tank upon the delivery-carrier. To effect the automatic advancement of the baskets upon successive holders 38 a rod 66 is supported to adapt it to be reciprocated longitudinally in bearings provided on the horizontal ends of arms 67 of inverted-L shape rising at intervals from the tank-ends and partitions between them to extend the rod-bearings along the longitudinal center of the tank, and pusher-fingers 68 depend at proper intervals rigidly from the rod to engage the rear ends of the baskets. For reciprocating this rod it has a link-connection 69 with a horizontal crank-arm 70 on the upper end of a vertical rock-shaft 71 (Fig. 3) journaled in bearings respectively in the flange on the upper edge of the tank and in a frame 72, and this vertical shaft carries on its lower end a segmental pinion 73 meshing with a rack 74 supported for longitudinally reciprocable movement in the frame 72. In this frame is also journaled a shaft 75 provided with a toothed wheel 175 which meshes with a pinion 140 on a shaft 40, the shaft 75 carrying a cam 76 of the construction shown, adapting it by engagement with it of a stud 77 depending from the rack to reciprocate the latter by a partial rotation of the shaft 40.

An important feature of the present invention is that of the circulation of the water in the tank, to maintain that in each end-compartment 24 and 25 at practically the same temperature (about 25° R. for beer), that in each intermediate compartment 23 and 26 at practically the same temperature of 40° R. (for beer) and that in each central compartment 21 and 22 at the pasteurizing temperature, which is about 48° R. for beer; and the course of circulation is that, as indicated by arrows (Figs. 2 and 8), from the compartments 21 and 22 through the upper port 18 into the attemperating-compartment 23, thence through the lower port 19 into the receiving-compartment 24, thence through a pipe 78 (only indicated in Fig. 8) into the delivery-compartment 25, and from the latter through the upper port 20 into the attemperating-compartment 26. For producing the circulation and heating the water for the pasteurizing action the jet-pump device 79 is provided which is most clearly illustrated in Fig. 9, with a steam-supply pipe 80 leading into its casing and its valve-stem 81 connected for automatic control of the device with a spring-retracted diaphragm 82 actuated by air-pressure directed against it through a pipe 83. The flow of air under pressure to the diaphragm is automatically controlled by the valve-device 84 most clearly illustrated in Fig. 11 and involving the adjustable spring-supported ball-valve 85 interposed, in a vented casing 86, between the air-pressure supply-pipe 87 and the pipe 83, the control of the valve being effected by a lever 88 engaging at one end with the stem 89 for setting the valve 85 and at its opposite end with the diaphragm 189 of a thermostat-device 90, the part of which outside the casing 86 is shown in Fig. 10 and is connected with the part thereof within said casing by a tube 91. The hole 186 shown to be provided in the casing 86 renders it open to the atmosphere to expose thereto the diaphragm 189.

The mechanism shown in Figs. 9 to 11, inclusive, and which is used by preference in connection with the present invention, is fully shown and described in my United States Letters Patent No. 886,012, dated April 28, 1908, and need not, therefore, be more elaborately described herein. This mechanism is duplicated on opposite sides of the tank, with a flow-pipe 93 leading into the casing of the steam-jet pump from a pipe 94 which connects the two compartments 21 and 26 near their upper ends outside the tank, and a discharge-pipe 95 leading from the pump into the lower part of the compartment 22. The tank is provided with an overflow-pipe 96 (Fig. 1) leading preferably to a sewer (not shown), and draw-off cocks 97 are shown on the lower parts of the compartments.

To start with, the tank is filled with cold water, which may be introduced in any desired manner, as through its open top by means of a hose. The jet-pump, by its operation, draws water through it from the upper parts of the compartments 26 and 21, heats it and discharges it in the heated condition into the bottom part of the compartment 22, and the water so heated circulates in the two compartments 21 and 22 over and under the partition 17, under the action of the agitators 51, to eventually raise the water therein and maintain it at the pasteurizing temperature. From the compartment 22 the circulation proceeds in the manner hereinbefore described to heat and maintain the water in each compartment 23 and 26 at the required temperature for preparing the bottles to enter the pasteurizing central compartments (which form practically a single compartment), and to heat and maintain the water in the end-compartments at the required temperature to adapt them, respectively, to receive the cold bottles without danger of fracturing them and deliver the same to the atmosphere with like lack of danger.

With the circulation thus proceeding, the operation of the machine is as follows: Rotation of the shaft 46, which maintains the agitators 51 in constant motion, slowly drives the shaft 40 continuously to cause the mutilated-gear device 41 to turn the carrier-shaft 27 through part of a rotation by the action of the worm-sections 42 and then, by engagement of the tooth-sections 43 with the gear 39, arrest the rotation of the carrier-shaft until the worm-sections again engage said gear. The arrangement is such as to cause each engagement of the worm-sections 42 with the gear to turn each of the carriers 28 one-half the distance between successive holders 38, so that with each carrier provided with ten holders, as shown, it requires two actions of said worm-sections to bring a longitudinal series of the holders into registration with the receiving and delivery points on the tank-ends, one of such actions serving to remove the holders out of that registration and out of the return-path of the pusher-fingers for the purpose hereinafter explained. This rotating shaft 27 furthermore drives the conveyers at corresponding speed, that at the receiving-end of the tank being supplied with baskets 65 containing the beer-bottles by an attendant who places such a basket on each lowermost patform 62 as it arrives in position to receive the same. The movements of the parts are so timed that with a basket conveyed to the receiving-point on the tank the carriers 28 will be arrested to aline a longitudinal series of holders 38 with that point, and the shaft 40, in rotating, turns the cam 76 to move the rack 74 in the direction to so turn the shaft 71 as to cause it to move the rod 66 in the direction toward the delivery-end of the tank, thereby engaging with the aforesaid basket a pusher-finger 68 then behind it, to advance that basket upon the holder 38 in position to receive it on the first rotary carrier 28. The next partial turn of the series of carriers takes the basket out of the return-path of the fingers 68, permitting the cam to return them to normal position, wherein the first finger will be behind the next basket brought by the conveyer into the receiving position. The next partial turn of the carriers brings the next succeeding holder on the first carrier into position to receive the basket then in place to be advanced by the first pusher-finger. In this way all the carriers become filled with the baskets, and each is intermittently rotated in each compartment to subject the bottles for the proper prolonged period to the temperature in that compartment, and at the end of each period of such subjection baskets in proper position are transferred to the successive compartments to be preliminarily heated in the compartment 23 after being warmed in the compartment 24 and thus prepared to enter the compartments 22 and 21 to be pasteurized therein, whence they enter the compartment 26 for preliminary reduction therein of their temperature and then attain the compartment 25 for successive delivery from the top thereof at about atmosphere temperature to the conveyer at that end of the tank, from the discharge end of which an attendant removes them in succession.

As will be observed, by the crank-connection 33 between the eccentric rim 34 and each rock-shaft 30 of the respective carrier 28, correspondingly with which the rim rotates, the holders on each carrier are maintained at all times in required horizontal position to support in that position the baskets 65.

What I claim as new, and desire to secure by Letters Patent, is—

1. In a pasteurizing-apparatus, the combination of a tank for the liquid containing a series of compartments forming in succession intercommunicating receiving, attemperating and pasteurizing compartments, a second attemperating-compartment non-communicating with the pasteurizing-compartment and a delivery-compartment communicating with said second attemperating-compartment, a pipe-connection between the end-compartments, a heater and pump for circulating back and forth the liquid in said pasteurizing-compartment and heating it in circulation, and means for conveying material to be pasteurized successively through the compartments from the receiving end of the tank.

2. In a pasteurizing-apparatus, the combination of a tank for the liquid containing a series of compartments forming in succession intercommunicating receiving, attemperating and pasteurizing compartments, a second attemperating compartment non-communicating with the pasteurizing-compartment and a delivery-compartment communicating with second attemperating-compartment, a pipe-connection between the end-compartments, a heater and pump connected with said pasteurizing and second attemperating compartments at their upper parts to take liquid from both and heat it in circulation and discharging into the lower part of the pasteurizing-compartment, and means for conveying material to be pasteurized successively through the compartments from the receiving-end of the tank.

3. In a pasteurizing-apparatus, the combination of a tank for the liquid containing partitions forming in series a receiving and an attemperating compartment with a lower port in the interposed partition, a pasteurizing compartment with an upper port in the next partition, a second attemperating-compartment having no direct conmunication with said pasteurizing-compartment and a delivery-compartment with an upper port in its forming-partition, a pipe-connection between the end-compartments, a heater and pump connected with said pasteurizing and second attemperating compartments at their upper parts to take liquid from both and heat it in circulation and discharging into the lower part of the pasteurizing-compartment, and means for conveying material to be pasteurized successively through the compartments from the receiving-end of the tank.

4. In a pasteurizing-apparatus, the combination of a tank for the liquid containing insulating partitions forming in series a receiving and an attemperating compartment with a lower port in the interposed partition, a pasteurizing compartment with an upper port in the next partition, a second attemperating-compartment having no direct communication with said pasteurizing-compartment and a delivery-compartment with an upper port in its forming-partition, a pipe-connection between the end-compartments, a partition, in the pasteurizing-compartment dividing it into sections intercommunicating at the top and bottom of said partition, an agitator-device in the communication between said sections provided with means for driving it, a heater and pump connected with said pasteurizing and second attemperating compartments at their upper parts to take liquid from both and heat it in circulation and discharging into the lower part of the pasteurizing-compartment, and means for conveying material to be pasteurized successively through the compartments from the receiving-end of the tank.

5. In a pasteurizing-apparatus, the combination of a tank containing a series of compartments for the liquid at different temperatures, a rotary carrier in each compartment, holders supported at uniform intervals about the carriers, intermittent driving means for the carriers operating to partially turn them at intervals to aline, by one partial turn, a longitudinal series of the holders with the feed and delivery ends of the tank and by the next-succeeding partial turn to take said series out of such alinement and thereby leave unobstructed by holders the path between said ends, and reciprocating pushing-devices on the tank for positively engaging baskets imposed on said alining holders to advance them, for the purpose set forth.

6. In a pasteurizing-apparatus, the combination of a tank containing a series of compartments for the liquid at different temperatures, a rotatable shaft extending lengthwise through the tank, a carrier in each compartment on said shaft consisting of a wheel provided with rock-shafts at intervals about its peripheral portion, a ring rotatably supported on said shaft eccentrically of the wheel and cranks connecting said rock-shafts and ring, holders on the rock-shafts and intermittent driving-means for said shaft, for the purpose set forth.

7. In a pasteurizing-apparatus, the combination of a tank containing a series of compartments for the liquid at different temperatures, a rotary carrier in each compartment, holders supported at uniform intervals about the carriers, intermittent driving-means for the carriers operating to partially turn them at intervals to aline, by one partial turn, a longitudinal series of the holders with the feed and delivery ends of the tank and by the next-succeeding partial turn to take said series out of such alinement and thereby leave unobstructed by holders the path between said ends, a rod supported in bearings on said tank to be reciprocated lengthwise, pusher-fingers depending at intervals from said rod into the path of baskets on said alining holders, and a cam-actuated connection between said rod and driving-means for moving the rod with each partial turn of said carriers, for the purpose set forth.

8. In a pasteurizing-apparatus, the combination of a tank containing a series of compartments for the liquid at different temperatures, a rotatable shaft extending lengthwise through the tank, a carrier in each compartment on said shaft, holders supported at uniform intervals about the carriers, intermittent driving-means for said shaft operating to partially turn the carriers at intervals to aline longitudinal series of the holders with the feed and delivery-ends of the tank, a rod supported in bearings on said tank to be reciprocated lengthwise, pusher-fingers depending at intervals from said rod into the path of boxes on said alining holders, a vertical rock-shaft having a crank-connection with said rod, a rack-and-pinion drive for said rock-shaft, and a rotatably supported cam engaging with the rack and geared to said driving-means, for the purpose set forth.

9. In a pasteurizing-apparatus, the combination of a tank containing a series of compartments for the liquid at different temperatures, a rotatable shaft extending lengthwise through the tank, a carrier in each compartment on said shaft, holders supported at uniform intervals about the carriers, intermittent driving-means for said shaft operating to partially turn the carriers at intervals to aline longitudinal series of the holders with the feed and delivery ends of the tank, and a conveyer geared to said shaft at an end of the tank and consisting of sprockets with endless chains connecting them and platforms at intervals on said chains on flexible supports thereon normally maintaining the platforms in horizontal position.

10. In a pasteurizing-apparatus, the combination of a tank containing a series of compartments for the liquid at different temperatures, a rotatable shaft extending lengthwise through the tank, a carrier in each compartment on said shaft, holders supported at uniform intervals about the carriers, intermittent driving means for said shaft operating to partially turn the carriers at intervals to aline longitudinal series of the holders with the feed and delivery ends of the tank, and a conveyer geared to said shaft at an end of the tank and consisting of sprockets with endless chains connecting them, platforms hinged at their advance-ends to said chains and legs pivotally connecting the opposite ends of the platforms to said chains, for the purpose set forth.

11. In a pasteurizing-apparatus, the combination of a tank containing a series of compartments for the liquid at different temperatures, a rotatable shaft extending lengthwise through the tank, a carrier in each compartment on said shaft, holders supported at uniform intervals about the carriers, intermittent driving-means for said shaft operating to partially turn the carriers at intervals to aline longitudinal series of the holders with the feed and delivery ends of the tank, a conveyer geared to said shaft at the receiving end of the tank to carry packages to said end and consisting of sprockets with endless chains connecting them and platforms at intervals on said chains on flexible supports thereon normally maintaining the platforms in horizontal position, and a similar conveyer geared to said shaft at the delivery end of the tank to carry packages away from said end, for the purpose set forth.

12. In a pasteurizing-apparatus, the combination of a tank containing a series of compartments for the liquid at different temperatures, a rotatable shaft extending lengthwise through the tank, a carrier in each compartment on said shaft, holders supported at uniform intervals about the carriers, intermittent driving-means for said shaft operating to partially turn the carriers at intervals to aline, by one partial turn, a longitudinal series of said holders with the receiving and delivery ends of the tank, and by the next-succeeding partial turn to take said series out of such alinement and thereby leave unobstructed by such holders the path between said ends, endless-chain conveyers geared to opposite ends of said shaft respectively to carry packages toward said receiving-end and from said delivery-end, and provided with platforms at intervals, and reciprocating pushing devices on the tank operatively connected with said driving means to positively engage baskets imposed on said alining holders and platforms alining therewith to advance said baskets, for the purpose set forth.

JOHN T. H. PAUL.

In presence of—
  W. T. JONES,
  R. A. SCHAEFER.